No. 618,310. Patented Jan. 24, 1899.
M. R. WILLIAMS.
COLANDER.
(Application filed Oct. 10, 1898.)
(No Model.)
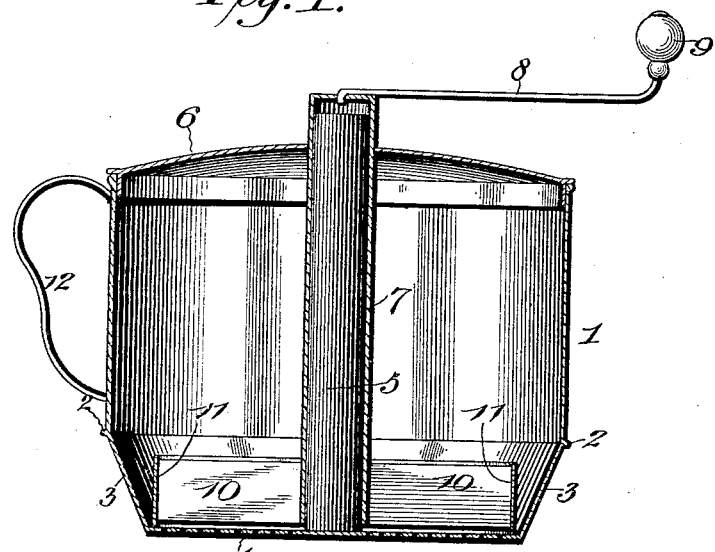
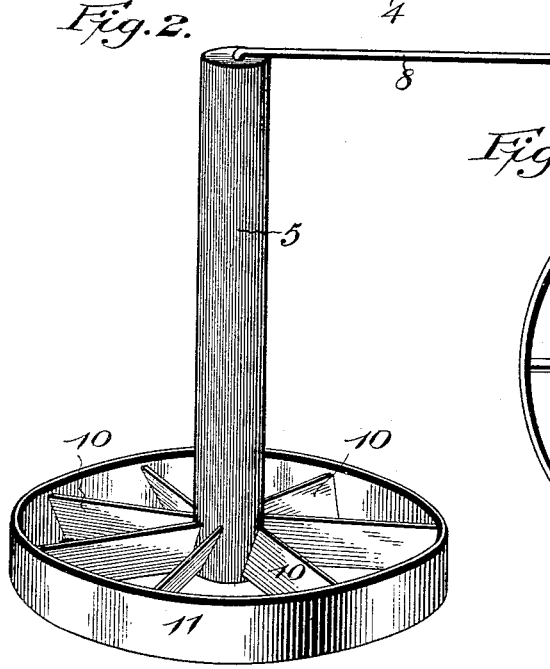
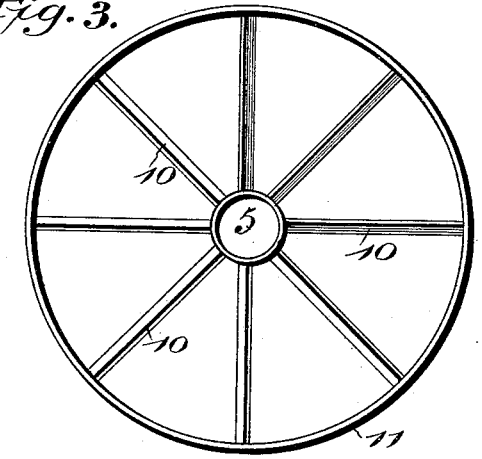
Witnesses  
Mae R. Williams, Inventor.  
By her Attorneys,

UNITED STATES PATENT OFFICE.

MAE R. WILLIAMS, OF LEITCHFIELD, KENTUCKY.

COLANDER.

SPECIFICATION forming part of Letters Patent No. 618,310, dated January 24, 1899.

Application filed October 10, 1898. Serial No. 693,163. (No model.)

*To all whom it may concern:*

Be it known that I, MAE R. WILLIAMS, a citizen of the United States, residing at Leitchfield, in the county of Grayson and State of Kentucky, have invented a new and useful Colander, of which the following is a specification.

This invention is applicable to colanders or devices for pressing and straining fruit and to flour-sieves or the like.

The object of the present invention is to provide such devices with a rotary beater or stirrer which may be adjusted in accordance with the amount of material to be treated; and to attain this result the device consists in the novel construction and combination of parts, as will be hereinafter described, and particularly pointed out in the claims.

In the drawings, Figure 1 is a vertical sectional view of the device. Fig. 2 is a detail perspective view of the rotary beater. Fig. 3 is an underneath plan view of the beater.

Similar numerals of reference indicate corresponding parts in all the figures of the drawings.

Referring to the accompanying drawings, 1 designates the body of the colander, preferably cylindrical in form and having an annular flange or shoulder 2, below which the body is preferably contracted or flared inward, as shown at 3. The bottom 4 is of some heavy foraminous material to withstand the action of the beater.

Extending vertically from the center of the bottom 4 is a shaft or spindle 5, upon which the beater is adapted to be mounted. This spindle is preferably constructed of sheet metal in the form of a hollow tube having a closed top to prevent any foreign matter entering into the material treated. As shown in Fig. 1, the spindle extends above the top of the colander or vessel and through a central opening in the cover 6.

The beater comprises a hollow stem 7, open at its bottom and closed at its top, where it is provided with a crank 8, having an operating-handle 9 at its outer end. A plurality of radial blades 10 are provided about the lower end of this stem and are supported at their outer ends by means of a circumferential ring 11, to which they are secured in any desired manner. These blades are inclined, as shown, to give the beater an auger action in its operation.

In operating the device the colander is placed over another vessel, with the flange 2 supporting the colander thereon and its contracted bottom portion within the top of the vessel. The fruit or other material to be treated is placed in the body of the device, and then the beater is placed in position by seating the hollow stem 7 over the spindle 5, with the beater-blades 10 resting upon the top of the material. The cover is then placed in position by passing it over the handle and crank by means of its central opening. By turning the crank through its handle 9 the beater is revolved about the spindle and operates upon the material within the body of the device to press the same through the perforated or foraminous bottom 4. By reason of the inclination of its blades the beater is fed through the material operated upon, and the stem 7, telescoping upon its spindle, permits of the beater feeding down to the very last portion of the material.

The cover may be dispensed with; but it is preferable to use it, as it supports the upper end of the spindle and stem against lateral movement and provides a much stronger mounting therefor. A handle 12 may be provided upon the side of the body of the colander, or a bail may be used, as desired.

The telescopic arrangement of the beater-stem upon the spindle adapts the device for use with only a small quantity of material as well as when it is full, and also permits of the beater being fed downward as the material is pressed through the perforated bottom.

Changes in the form, proportion, and minor details of construction may be resorted to without departing from the spirit and scope or sacrificing any of the advantages of the invention, and therefore I do not wish to be understood as limiting myself to the precise construction and arrangement of parts as herein described, and shown in the drawings.

Having thus described the invention, I claim—

1. In a device of the class described, the combination with a containing-body having a perforated bottom, of a spindle extending vertically from the bottom and within the body, a rotary beater having a stem which is adapted to fit and telescope upon the spindle during the operation of the device, and means for rotating the beater, substantially as shown and described.

2. In a device of the class described, the combination with a containing-body having a perforated bottom, and a spindle extending upward therefrom, of a rotary beater, comprising a hollow stem having a plurality of radially-disposed inclined beater-blades, and a circumferential ring to which the outer ends of the blades are connected, and means for rotating the beater upon the spindle, substantially as shown and described.

In testimony that I claim the foregoing as my own I have hereto affixed my signature in the presence of two witnesses.

MAE R. WILLIAMS.

Witnesses:
 JOHN F. WILLIAMS,
 A. S. GARDNER.